June 23, 1970     G. V. HARRIS ETAL     3,516,477
CORE MAKING MACHINE

Filed April 5, 1968     6 Sheets-Sheet 1

INVENTORS:
GEORGE V. HARRIS
ARDEN L. BORGEN

BY: James E. Miller
ATTORNEY

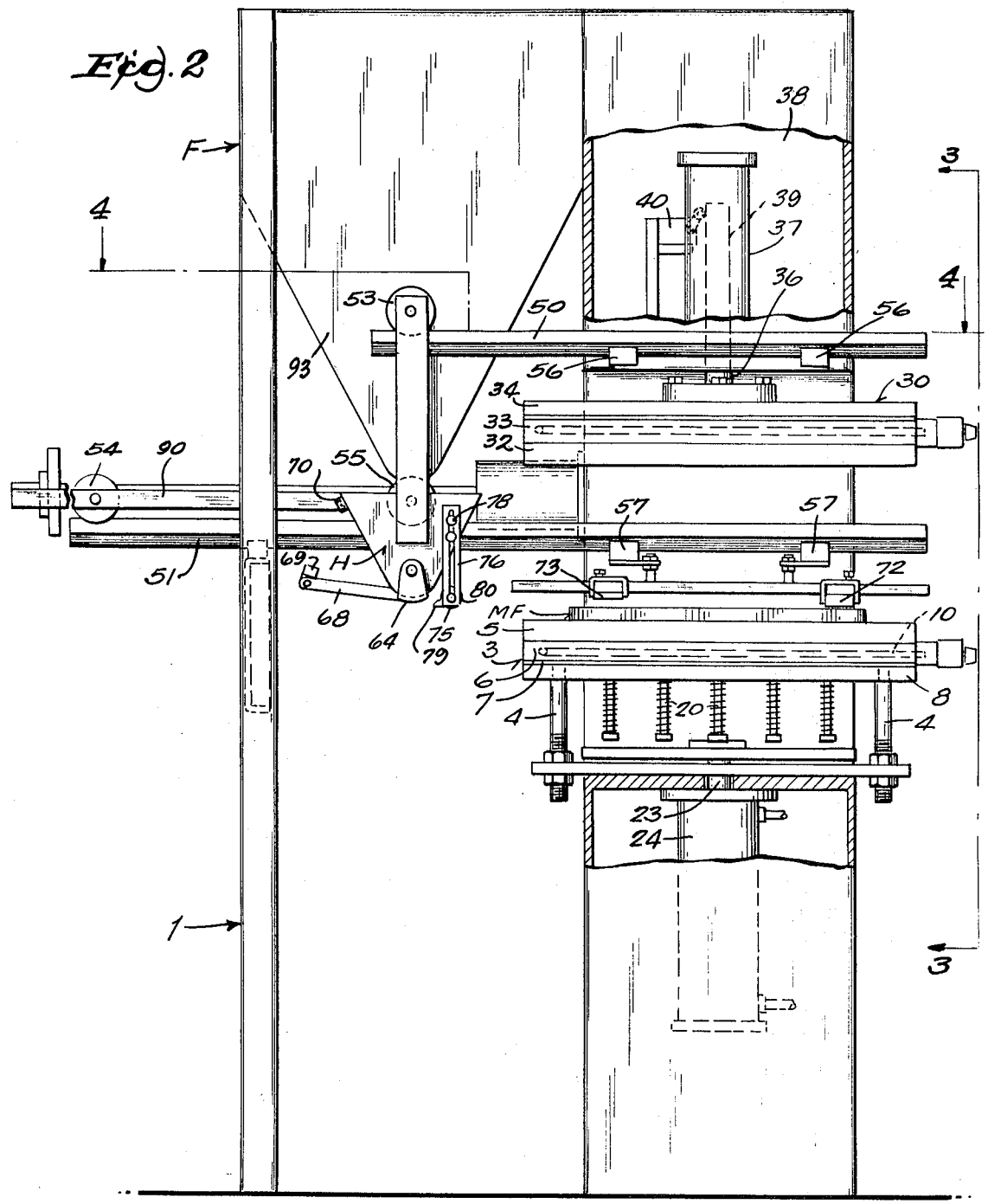

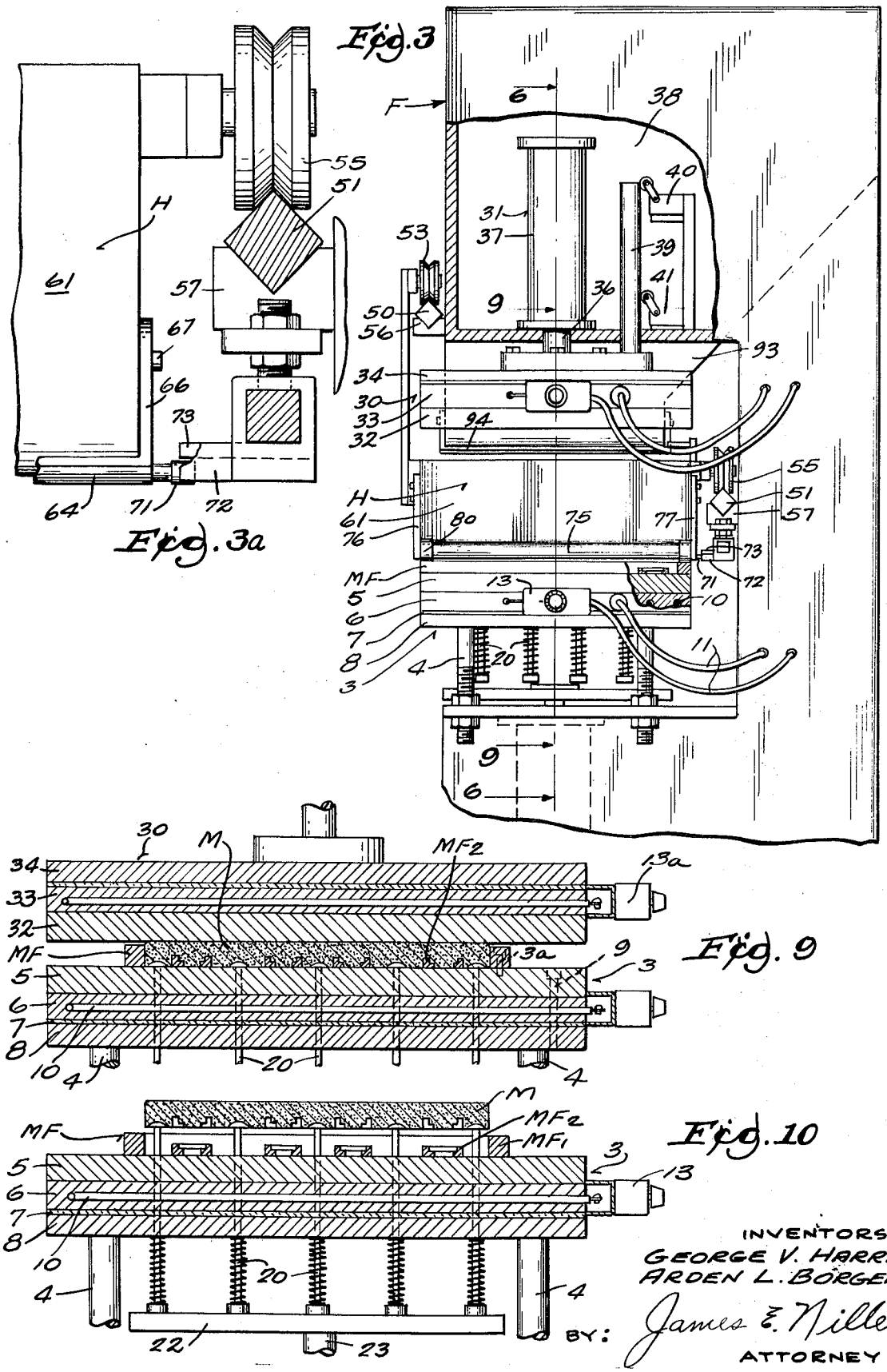

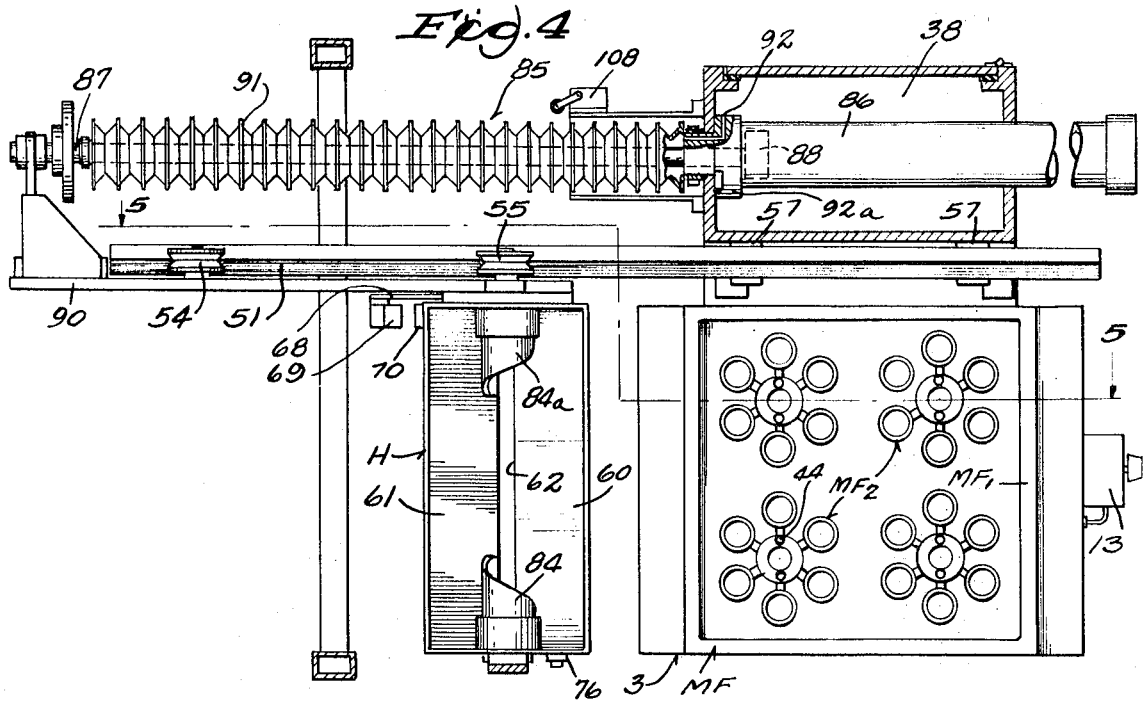
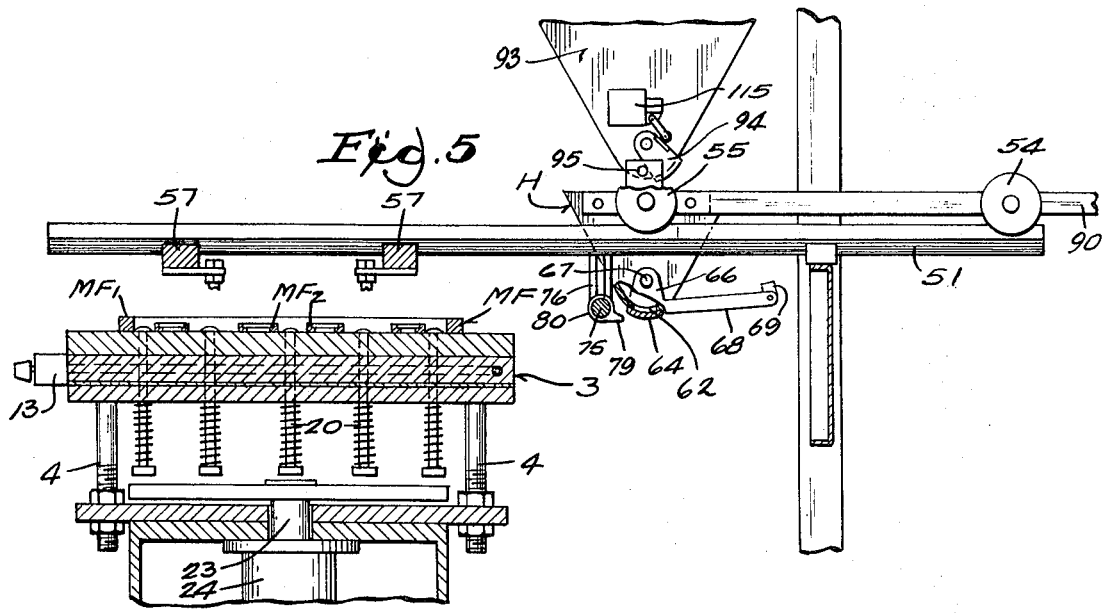

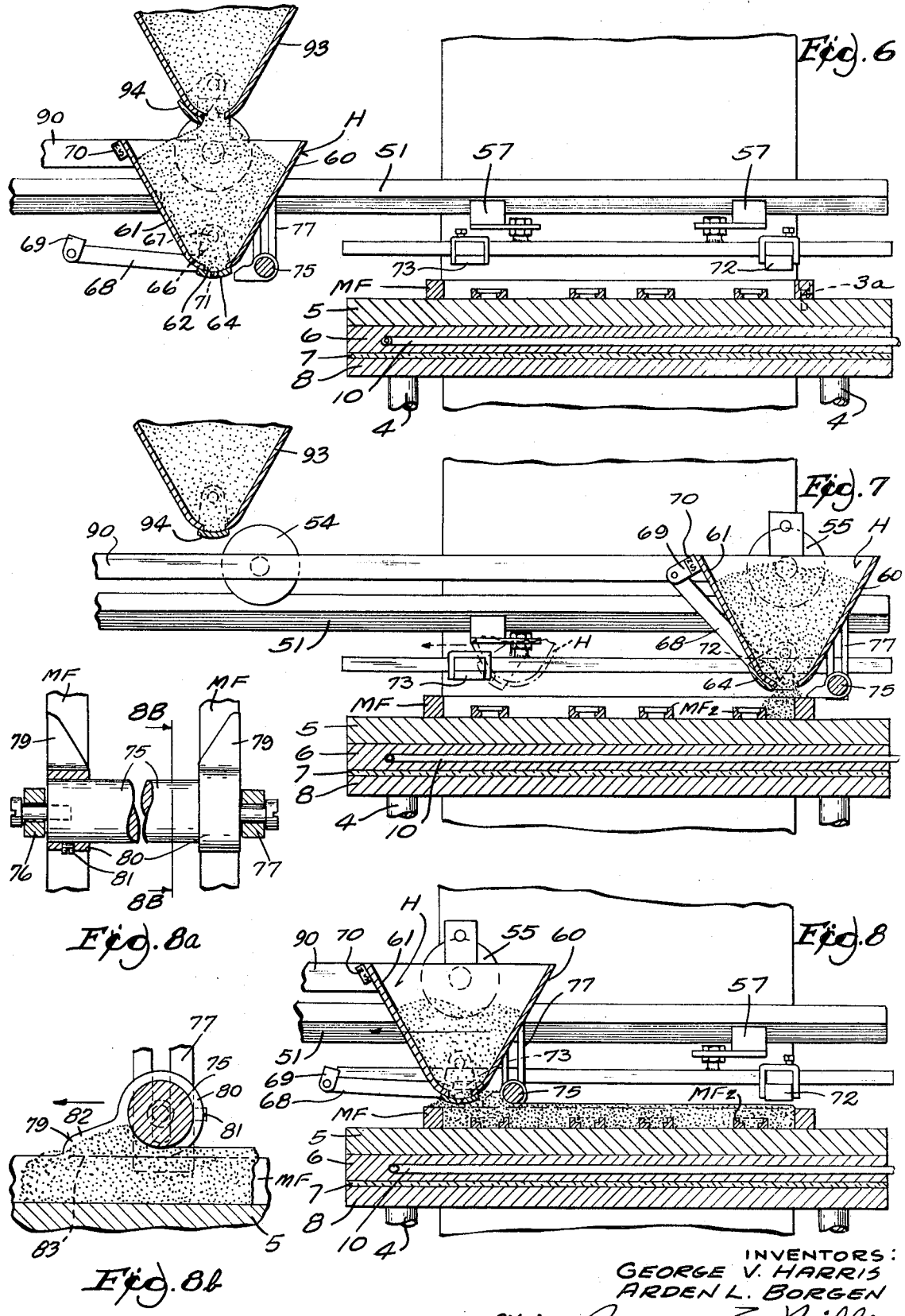

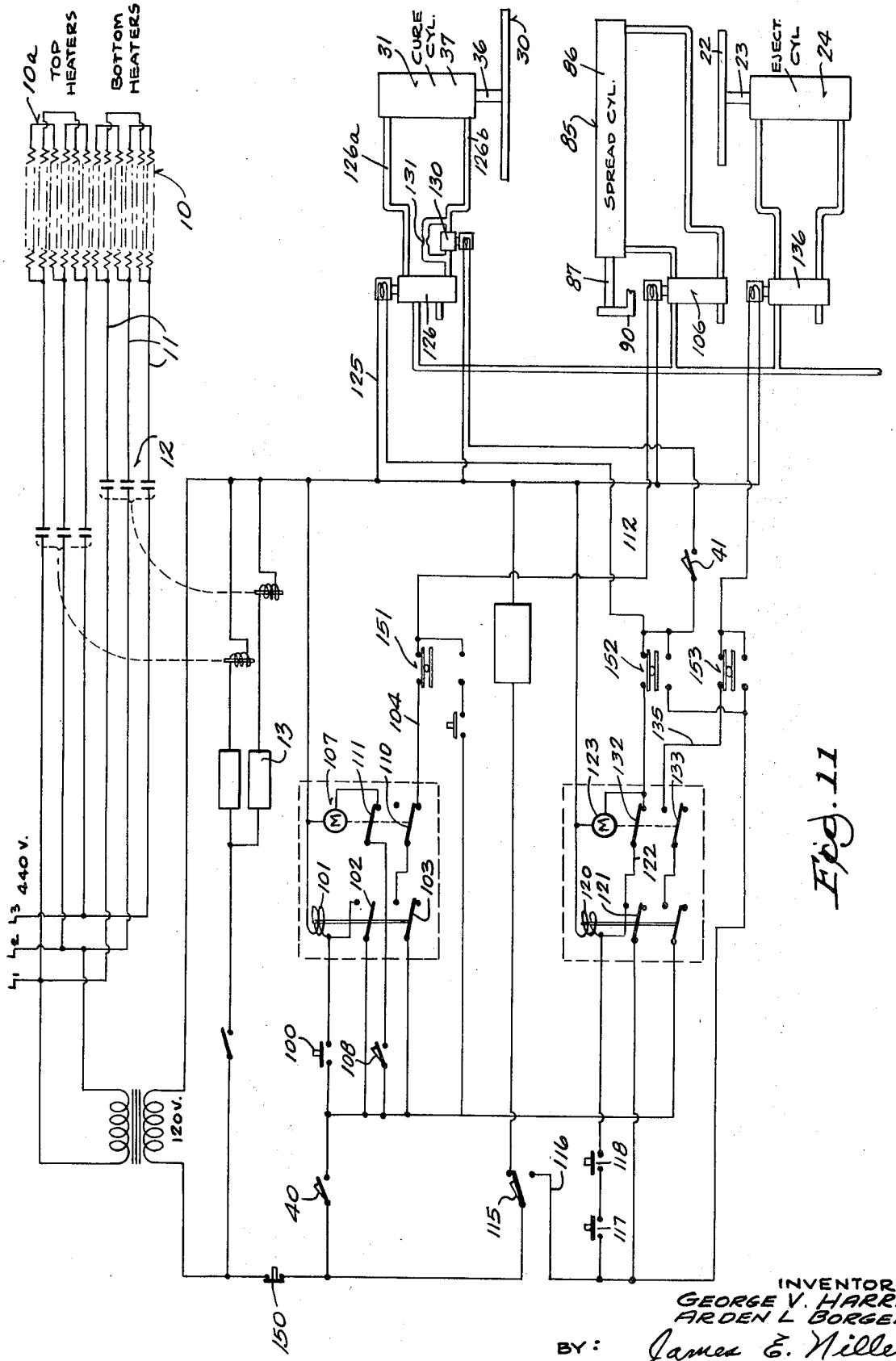

United States Patent Office 3,516,477
Patented June 23, 1970

3,516,477
CORE MAKING MACHINE
George V. Harris and Arden L. Borgen, Racine, Wis., assignors to Harris Metals, Inc., Racine, Wis., a corporation of Wisconsin
Filed Apr. 5, 1968, Ser. No. 719,130
Int. Cl. B22c 15/28, 19/04
U.S. Cl. 164—157   10 Claims

ABSTRACT OF THE DISCLOSURE

A machine for making molds for foundries and including means for automatically and accurately filling the mold forms with sand or the like, curing the mold by heat and in a very short time, and ejecting the finished mold.

BACKGROUND OF THE INVENTION

The present invention pertains to machines for making disposable molds for foundries or the like, such as of the shell mold type wherein the mold is then filled, with metal for example, to form a finished product. The molds are of the type that are cured by heat.

Machines of this general character have been used heretofore but have proved unsatisfactory in some respects. For example, the prior art machines were very complicated and the mold forms were difficult to completely and accurately fill with said, often being formed with shadows, due to trying to fill an intricate mold from one pressure supply opening, which ultimately resulted in a poor casting. In an attempt to eliminate shadows or unfilled spots in the mold, some of the prior art machine tumbled the mold forms during filling thereof. These pressure filling machines also resulted in considerable waste when blow-by occurred due to frequent failure of the molds to close properly, or waste due to spilling, or by leakage if a pressure conduit brokeor became dislocated.

SUMMARY OF THE INVENTION

The present invention provides a mold making machine having a horizontally disposed mold which is filled with sand by gravity and from a spreader hopper that travels across the top of the mold. The mold is filled completely and the excess sand is smultaneously and precisely scraped off the top of the mold, leaving a smooth top located slightly above the top of the mold form. An upper platen then descends and bears against the top of the sand while the mold is being cured by heat. After a very short heating period the top platen is raised and the finished mold is ejected. All of the above operations are accomplished rapidly, without the loss of expensive sand, and a very sharp and precise mold is thereby provided. There is no shadowing or mold wear during the gravity filling operations, and the timing of the travel of the spreader hopper is such as is the operation of the hopper discharge gate, that complete mold filling is assured with no spilling of the said. Another aspect of the invention relates to deceleration of the upper platen during the last stage of its downward movement into pressing contact with the mold, whereby turbulence and disturbance of the sand is avoided.

Other objects and advantages of the present invention will appear as this disclosure progresses, reference being had to the accompanying drawings.

BRIEF DESCRIPTION OF THE DRAWINGS

FIG. 2 is a front elevational view of the machine shown in FIG. 1, certain parts being shown as broken away and in section for clarity in the drawing;

FIG. 3 is a fragmentary, right side elevational view of the machine, parts being shown in section or broken away for clarity;

FIG. 3a is a fragmentary, enlarged detail view in section of a portion of the machine as shown in FIG. 3, namely, gate activating cams;

FIG. 4 is a plan view, in section, taken generally along the line 4—4 of FIG. 2 and with certain parts removed;

FIG. 5 is a fragmentary elevational view, in section, taken along line 5—5 in FIG. 4;

FIG. 6 is a fragmentary, front elevational view, in section, taken along line 6—6 in FIG. 3 and showing the spreader hopper at the extreme left end position and being filled from a supply bin;

FIG. 7 is a view similar to FIG. 6 but showing the hopper in full lines at its extreme right end position and while sand is being released to the mold form just prior to the hopper commencing its leftward, mold form filling travel;

FIG. 8 is a view similar to FIG. 7 but showing the hopper after it has completed its mold form filling travel and after the hopper gate has been closed by a cam;

FIG. 8a is an enlarged, fragmentary plan view taken along line 8a—8a in FIG. 8;

FIG. 8b is a sectional view taken along line 8b—8b in FIG. 8a;

FIG. 9 is an enlarged sectional view taken generally along the line 9—9 in FIG. 3, but showing the upper platen in the operative position against the mold while the latter is being cured;

FIG. 10 is a view similar to FIG. 9 but showing the upper platen in the raised position away from the mold and the latter after it has been ejected from the mold form;

FIG. 11 is a combined electrical and pneumatic circuit diagram used with the present invention.

DESCRIPTION OF A PREFERRED EMBODIMENT

Figure 1:
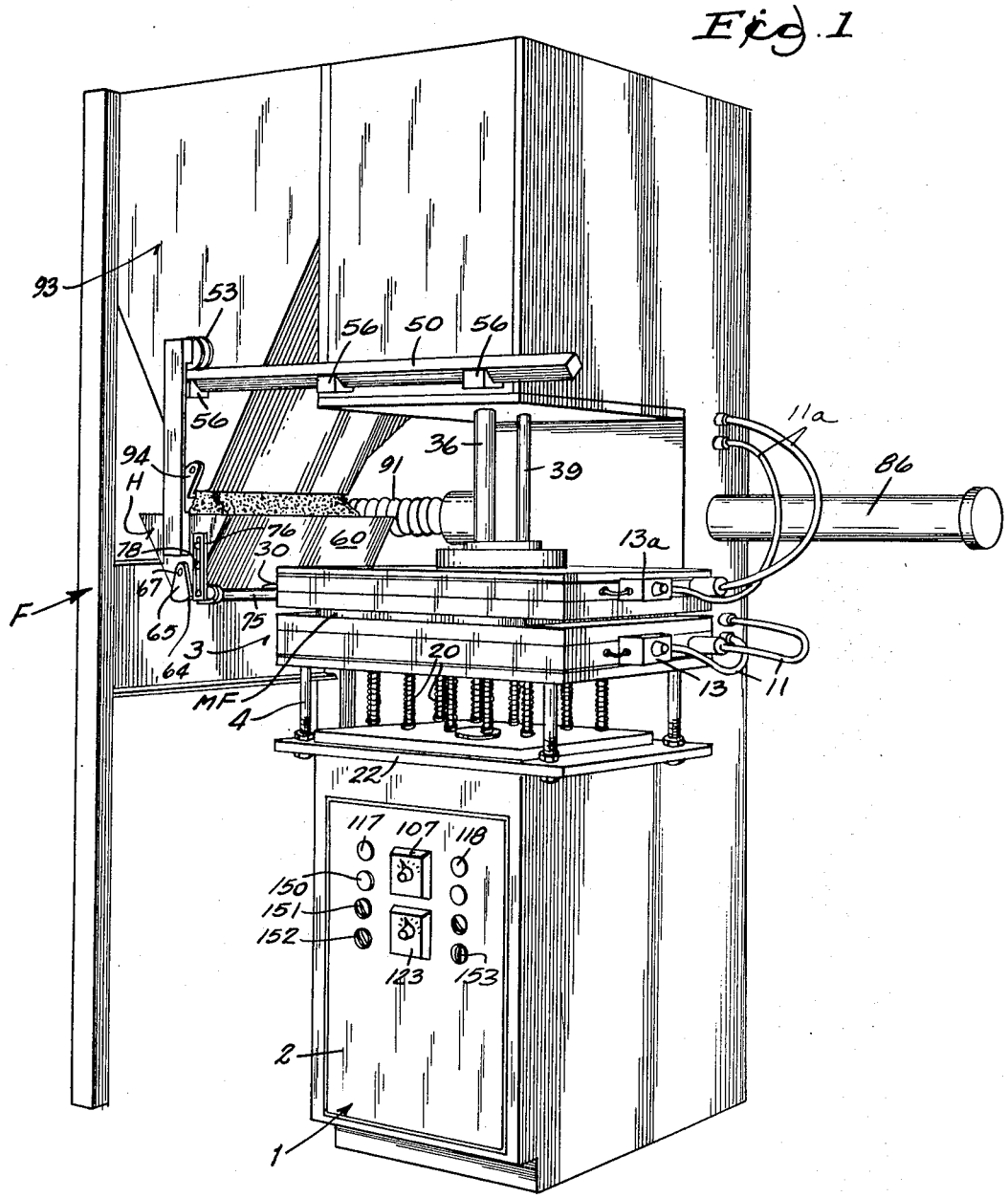
FIG. 1 is a perspective view of a core making machine made in accordance with the present invention, the view being taken generally from the front, right corner of the machine.

The core making machine provided by the present invention includes a generally upright frame F having a front or operator's side 1 on which a control panel 2 (FIG. 1) is mounted.

MOLD SUPPORT MEMBER

A horizontal, lower support member 3 is fixed in position on the frame on four posts 4. This member 3 is adapted to support the mold form MF on its upper surface, the form MF being removably fixed to the member 3 by suitable cap bolts, as will appear. More specifically the lower support member 3 includes a steel top plate 5 to which the mold form MF is secured by bolts 3a or the like, an intermediate heating plate 6 of aluminum for example, a sheet insulating material 7 and a lower steel plate 8. Plates 5, 6, 7, and 8 are all secured together by bolt members 9, and form a heated, lower, horizontal support members 3 for supporting the mold form MF thereon. The heater plate 6 has a heating element 10 extending therethrough and may be cast into the plate 6. This heating element 10 may be a continuous Calrod element through which electrical energy is passed via electrical wires 11 (FIGS. 1, 3 and 11) from a high voltage source of, for example 440 volts, from lines L1, L2, and L3. On-off switches 12 are provided in the power lines and are connected with a thermostat 13.

The lower support 3 has a series of ejection rods 20 slidably mounted therein, as clearly shown in FIGS. 9 and 10, and which are spring biased to a withdrawn or lower position. An ejection plate 22, fixed on the upper end of a piston rod 23 of a cylinder 24, acts to force the mold M upwardly out of the mold MF while the piston is extended in the pneumatic cylinder, as will appear more fully. The double acting, pneumatic cylinder 24 and piston rod 23 may be referred to as an ejection cylinder.

UPPER PLATEN

A vertically shiftable upper platen 30 is also provided on the frame and is shiftable by an extensible cylinder means 31 between an upper, open or inoperative position shown in FIGS. 2 and 3, and a lower, mold curing position shown in FIGS. 1 and 9. As shown clearly in FIGS. 1, 3, and 9, this upper platen is comprised of a lower smooth, steel plate 32, an aluminum intermediate heating plate 33 and an upper steel plate 34, all suitably secured together. The construction and operation of the heating plate 33 is similar to that of heating plate 6 and similar parts have been correspondingly referenced with numerals having a letter *a* suffix.

As shown in FIG. 9, the outer rectangular portion MF1 of the mold frame MF has been filled with sand to an extent that the smooth lower surface of plate 32 is spaced a small distance from the top of the mold form MF when the upper platen has been lowered to a curing position. Thus the top of the mold is formed as a smooth surface and complete filling of the mold is assured because, among other things, the plate 32 does not bear against the mold form. The means for insuring this clearance between the mold form and plate 32 will appear later.

The cylinder means 31, which constitutes a power means for the upper platen, is comprised of a piston 36 secured to the upper platen, a cylinder 37 fixed within a sealed compartment 38 in the machine frame. Cylinder means 31 may be referred to as a "cure" cylinder.

A post 39 (FIGS. 1 and 3) is fixed to platen 30 for vertical movement therewith and acts to guide the platen and prevent its turning so as to insure its alignment with the lower support 3. The post also serves to actuate limit-switches 40 and 41 at the upper and lower portions of its travel, as will appear.

MOLD FORM

The mold form MF comprises an outer, rectangular frame MF1, previously referred to, and a series of forms MF2 located within the forms and also secured in fixed position on the lower support member 3 by suitable bolt means 44. The inner forms MF2 are of less height than the outer form MF1, and of course take various forms and shapes as required.

SPREADER HOPPER

Means are provided for filling the mold form while the upper platen is in the raised position. This means comprises a spreader hopper H which is mounted on a pair of vertically and horizontally spaced guide tracks 50 and 51, as shown in FIGS. 1, 2 and 8 inclusive. The hopper is mounted for horizontal travel over the top of the mold, from and to a position clear of the mold.

Guide tracks 50 and 51 are formed from steel bar stock of square cross section and are positioned so one of their corner edges is located on the upper side to present a guide surface that complements the V-shaped rims of the hopper wheels 53, 54, and 55 which ride thereon. Tracks 50 and 51 are securely fixed to the frame of the machine by brackets 56 and 57, respectively. The parallel tracks are located and arranged so the hopper can move horizontally over the mold form when the upper platen is raised.

The hopper H is elongated in form from the front to the rear of the machine so as to extend fully across the length of the mold form from front to rear. The hopper has downwardly converging sides 60 and 61 (FIGS. 6, 7, and 8) which terminate in an elongated slot 62 at the bottom of the hopper through which the sand falls into the mold at the appropriate time when the swingable gate 64 is open.

The hopper gate 64 includes an upwardly extending arm 65, 66, (FIGS. 6 to 8) at opposite ends which are pivoted to the end walls of the hopper about an axis 67. A lever 68 (FIGS. 2, 4, 6–8) is fixed to the gate arm 66 and has a magnet 69 at its outer end for abutment with a magnet 70 fixed to the upper edge of the hopper. The magnets 69, 70, act to hold the gate open unless the gate is forced open by means now to be described.

As shown best in FIGS. 3 and 3*a*, the hopper gate 64 also has a cam follower 71 rigidly fixed to and extending rearwardly from the gate. This follower 71 is adapted to abut against a stop 72 at the right side of the machine as viewed in FIGS. 2, 4, and 6 to 8, and this stop 72 causes the gate to be positively opened, against the holding action of the magnets, when the hopper has travelled to the extreme right hand position where it begins its sand depositing function. Another stop 73 also secured to the machine frame, at a higher elevation than cam 72, acts to cause the gate to close at the end of its leftward sand depositing travel over the mold, as shown in dotted lines in FIG. 7. The stop 73 is positioned so that the gate is closed just before the hopper reaches the left side of the mold in order to use up the sand which has dropped from the hopper and thereby avoid spilling of excess sand. In other words, the position of the 73 is calculated to just use up all the sand to fill the mold and provide no excess when the hopper leaves the mold in returning to its most leftward position shown in FIG. 6.

As previously mentioned, the top of the outer mold form MF1 is located below the top surface of the sand as the latter is formed by the action of a scraper bar 75 which is attached to and along the right side of the hopper, as viewed in FIGS. 6–8. The bar 75 is shown as being round in cross section and is quite heavy and can slide in the slotted posts 76 and 77 located at and fixed to opposite ends of the hopper by set screws 78. For the purpose of insuring that the bar 75 scraps off the sand at a certain height above the mold form MF1, guide means in the form of a pair of guide shoes 79 are fixed to the ends of bar 75, one at each end, and these shoes carry the weight of the bar and ride along on the opposite top surfaces of the rectangular mold form MF1. These shoes 79 are in the form of a collar 80 which surrounds the bar 75 and are locked thereto by Allen screws 81. The shoes have a flat, forwardly extending portion 82 that has a lower surface 83 which rides on the mold form MF1. The portion 82 is also pointed or beveled inwardly toward the mold, when viewed (FIG. 8*b*) in plan, so as to clear off the sand from the mold form MF1 ahead of the flat gauge surface 83 and push the sand inwardly, to thereby insure an accurate height of the sand above the mold form. It has been found that a round or oval cross sectional shaped bar gives a good smoothing action on the sand.

As previously mentioned, because the top of the sand is above the mold form MF1, the upper platen rests on the top of the sand, and not on the mold form, thus insuring complete filling of the mold form. The platen bears against the sand with a pressure of only about 3½ pounds per square inch. It should be mentioned that with the present invention the mold forms fill completely by the gravity action of the sand, and the upper platen is primarily for forming a flat and smooth upper surface on the mold, and also for curing thereof.

The hopper has means inside of it for varying the amount of sand which can flow through its opening 62, that is, which determines the flow rate. This means takes the form of a pair of tubular members 84, 84*a*, mounted on each inner end of the hopper. Members 84 and 84*a* each have their inner ends formed as a spiral or helix, and these members are adjustably rotated so as to close-off the length of the opening 62 to the desired degree.

This adjustment thus varies the effective discharge length of opening 62, depending on the selected length, of the varying length members 84 and 84a, which is used to block opening 62. Thus the same hopper H can be used for different molds requiring different sand flow rates to properly fill the molds.

The power means for reciprocating the hopper H along its guide tracks includes a double acting, pneumatic cylinder means 85 (FIGS. 1, 4, and 11) which is horizontally disposed at the rear of the machine. This cylinder means 85, which may be referred to as the spread cylinder, includes a cylinder 86 fixed to the machine frame, and a piston rod 87 having a piston 88 sealingly reciprocal in the cylinder. The free end of the rod 87 has a long connecting member 90 fixed thereto and extending in parallel relationship therewith. It is on this member 90 that wheels 54 and 55 are rotatably mounted, and to which the rear end of the hopper is fixed.

As the piston rod 87 is contracted, the hopper moves to the right, that is, toward the starting position (FIG. 7) for depositing sand in the mold. As the piston rod is extended, the hopper moves across the mold, depositing sand therein until the hopper gate closes adjacent the left side of the mold (as viewed in FIG. 8) and continued movement of the hopper returns it to its starting position under a sand storage bin 93 from which it is loaded at the end of each mold filling operation, as will appear.

An expansible bellows 91 (FIG. 4) surrounds and seals the piston rod 87 and protects it from dust and other foreign matter. Air is exhausted from and enters the bellows via a passage 92 in the mounting collar 92a of the piston. As previously mentioned the compartment 38 in the frame F is sealed against the entry of air, and passage 92 is in communication with this compartment. In this manner only clean air is permitted to enter the bellows, thus protecting the piston rod.

SAND STORAGE BIN

The bin 93 is shaped similarly to the hopper H but is larger, and the bin can be periodically filled by manual or automatic means (not shown). The gate 94 of the bin is automatically opened by return movement of the hopper under it. More specifically, a pin 95 (FIGS. 5 and 6) carried on the rear end of the hopper H abuts against the bin gate 94 causing it to open. Opening of this gate also causes actuation of an interlock micro-switch 115 (FIG. 5) to be referred to later, thus making possible the operation of the cure cylinder means 31. The gate 94 closes by gravity as soon as the hopper begins to move away from it.

ELECTRICAL CIRCUIT AND OPERATION

The general operation of the electrical circuit shown on FIG. 11 is as follows:

Assume that the cure cylinder means 31 is in the upper position, the hopper H is filled and in the position at the left as viewed in FIG. 2, and the machine is ready for its first operation.

The operator manually closes the spread button 100 which energizes the relay 101 which in turn closes relay switch 102 which then acts as a holding circuit. Energization of the relay also raises its switch 103 which causes current to flow through line 104 to the fourway solenoid valve 106 of the spread cylinder 85. This causes the air pressure to actuate the spread cylinder, thus moving the hopper H to the right as viewed in FIG. 1. When the hopper has approached the end of its rightward movement, the stop 72 causes the gate 64 of the hopper H to swing open to the position shown in full lines in FIG. 7.

When the hopper is in the position shown in FIG. 7 a period of dwell of approximately 2 seconds is provided to permit sand to pile up at the right hand side of the mold, to assure complete filling, that is, to create a small stockpile of material prior to the movement of the hopper to the left. This dwell period is provided by the timing mechanism 107 which has been energized by closing of the switch 108 by the hopper when the latter has reached its right hand limit. After a period of approximately 2 seconds, the timer 107 then raises the switches 110 and 111, thus opening the line 112 and consequently the circuit to the fourway solenoid valve 106. Breaking the circuit in line 112 causes the spring returned solenoid valve 106 to shift, thus permitting air pressure to go to the opposite end of the spread cylinder 86, consequently causing the hopper to begin its movement to the left, namely, its mold filling operation. As the hopper begins its leftward movement, the limit-switch 108 is permitted to open.

As the hopper approaches the end of its mold filling operation, the other stop 73 actuates the follower 7 on the gate 64 (FIG. 7a) thus causing the magnets 69, 70, to be separated and permitting the hopper gate 64 to close. As the hopper moves to its extreme left position under the supply bin 93, the gate 94 of the supply bin is caused to swing open as shown in FIG. 5 and 6, thus actuating limit-switch 115. Actuation of the limit-switch 115 stops the leftward movement of the hopper, and also acts as an interlock which permits actuation of the cure cylinder 36.

The machine is now in condition for the cure platen to descend. The limit-switch 115 has now energized the cure circuit by making contact with line 116. The operator then presses a pair of manual switches 117 and 118 so as to start the operation of the cure cylinder 36 in the downward direction. The relay 120 is energized by manually pressing buttons 117 and 118, thus forming a holding circuit by means of its switch 121. Power then also flows through line 122 to start the time motor 123 running. This also causes current to flow in line 125, thus energizing the spring returned, fourway solenoid valve 126. The cure cylinder is pressurized via line 126a, acting to lower the platen 30 to a position a few inches from the mold and at this time the cure cylinder is slowed in its action to slow the descent of platen 30 so that air currents do not disturb or blow the sand away from the mold. This deceleration of the platen is provided by the closing of the limit switch 41 (FIGS. 3 and 11). Opening of the limit switch 41 causes energization of the on-off deceleration valve 130. Valve 130, which is held open electrically, then closes the normal air release line 126b from the rod end of the cure cylinder means 36, forcing the air pressure to be throttled through an orifice 131, resulting in a slower movement of the platen during its last portion of its downward movement. Thus, the cure cylinder platen has pressed itself firmly but lightly against the top of the sand and the resistance of the sand prevents further downward movement of the platen. In other words, there is a continuous pressure on the top of the sand, which amounts to about 3½ pounds per inch. This pressure is applied continuously during the curing operation. The timer 123 continues to time the heating cycle for a relatively short period of time, say for example in the order of 1½ minutes, which is all that is required for curing of the mold with the present invention. After that period of time, the switches 132 and 133 associated with the timer 123 open, thus energizing line 135 which in turn energized the four-way solenoid, spring return valve 136. Energization of this valve 136 causes the ejection cylinder 24 to extend, thus raising the cured mold by means of the push rods 20, as shown in FIG. 10.

The reset button 150 is an emergency stop device and when manually pushed, in case of a malfunction or the like, causes all of the cylinders to go to the normal position.

Switches 151, 152, and 153 are shown in the upper position in FIG. 11 for automatic operation. If manual control is desired for these switches, they would be in the other lower, position.

RECAPITULATION

The high speed core making machine of the present invention provides a spreader hopper that travels horizontally between heated members and quickly, accurately and completely fills the mold form without any appreciable loss of sand. The gravity fed sand fills the mold form without the need of pressure and without the formation of shadows in the core. The top of the core is precisely located and smoothly formed by the hopper scraper, and this top is undisturbed by air pressure as the upper platen descends to lightly but firmly press the core top.

We claim:

1. A core making machine comprising, a main frame, a heated, horizontal mold support member mounted on said frame and adapted to have a mold form thereon, a heated upper platen mounted on said frame and directly above said support member for vertical movement between a raised position away from said support member and a lower mold curing position closely adjacent but spaced from said support member and the mold form thereon, a spreader hopper horizontally shiftably mounted on said frame for movement across the top of the mold form, said hopper adapted to have core sand therein and also having a sand discharge opening in the lower portion thereof for discharging sand by gravity into said mold form on said support member, and a scraper spaced rearwardly from said hopper in the direction of sand-applying travel, said scraper attached to said hopper and having a scraping surface located a distance above said mold form and above the position of said platen when the latter is in said lower position for scraping excess sand above the top of said mold and smoothly forming said top as said hopper moves thereacross.

2. The machine set forth in claim 1 further characterized in that said hopper has guide means which abuts along the top of said mold form as said hopper moves thereacross to thereby form the top of said mold at an elevation slightly above said mold form.

3. The machine as described in claim 2 further characterized in that said guide means is formed to scrape sand off that portion of said mold form against which said guide means abuts.

4. The machine according to claim 1 including mold ejection means shiftably mounted in said support member for ejecting the mold from said mold form, and power means for actuating said ejection means when said upper platen is raised.

5. A core making machine comprising, a main frame, a heated, horizontal mold support member mounted on said frame and adapted to have a mold thereon, a heated upper platen mounted on said frame and directly above said support member for vertical movement between a raised position away from said support member and a lower position closely adjacent but spaced from said support member and the mold form thereon, first power means for vertically positioning said upper platen, electrical means for heating both said platen and support member to thereby cure a mold located therebetween, a spreader hopper horizontally shiftably mounted on said frame and adapted to have core sand therein and also having a sand discharge opening in the lower portion thereof for discharging sand by gravity into said mold form on said support member, said hopper having a closable gate for said opening, second power means for horizontally shifting said hopper across the top of said mold form when said platen is in said raised position to thereby permit sand to fill said mold form by gravity when said hopper gate is open, and said hopper having a scraper for scraping excess sand on the top of said mold and forming said top into a smooth condition as said hopper moves thereacross, said scraper being spaced rearwardly from said hopper in the direction of sand-applying travel, said scraper having a scraping surface located a distance above said mold form and above the position of said platen when the latter is in said lower position, said second power means being operative to move said hopper out from between said platen and support member after said mold form is filled, said first power means then being operative to lower said platen into pressing engagement on the top of the mold so formed for curing of the mold by said heated platen and support member.

6. The machine set forth in claim 5 further characterized in that said hopper has guide means which abuts along the top of said mold form as said hopper moves thereacross to thereby form the top of said mold at an elevation slightly above said mold form.

7. The machine as described in claim 6 further characterized in that said guide means is formed to scrape sand off that portion of said mold form against which said guide means abuts.

8. The machine set forth in claim 6 including a pair of stops mounted in spaced relationship on said frame and adjacent opposite sides of said mold form, said hopper gate being abuttable against one stop to open said gate for a sand dumping operation, said gate also abuttable against the other stop to close said gate.

9. A machine according to claim 5 including an electrical circuit comprising, electrically operated valve means for controlling said first power means and said second power means whereby said upper platen decelerates in its downward movement adjacent said mold form, and said hopper has a period of dwell after its gate has been opened and before commencing its sand discharging travel over the mold form.

10. A machine according to claim 5 including an electrical circuit comprising, electrically operated valve means and relay timer means for each of said first and second power means for actuation thereof in timed relationship with one another so that said second power means causes said hopper to pass over said mold form and deposit sand therein and then causes said hopper to move clear of said mold form, and then said first power means causes said upper platen to descend into curing contact with the mold in the mold form for a time interval and then raise free of said mold.

References Cited

UNITED STATES PATENTS

| | | | |
|---|---|---|---|
| 939,581 | 11/1909 | Zimmerman | 164—338 |
| 2,437,109 | 3/1948 | Maquat | 18—24 |
| 2,778,074 | 1/1957 | Zimmerman | 164—157 |
| 2,806,262 | 9/1957 | Davis | 164—157 |
| 3,263,282 | 8/1966 | Conger | 164—192 |

J. SPENCER OVERHOLSER, Primary Examiner

J. E. ROETHEL, Assistant Examiner

U.S. Cl. X.R.

164—165, 186, 227